(12) United States Patent
Blagotinsek et al.

(10) Patent No.: US 9,226,620 B2
(45) Date of Patent: Jan. 5, 2016

(54) KITCHEN APPLIANCE WITH A PIVOTING ARM

(75) Inventors: Andrej Blagotinsek, Slovenj Gradec (SI); Ales Brecko, Celje (SI); Marko Uplaznik, Prebold (SI)

(73) Assignee: BSH HAUSGERAETE GMBH, Munich (DE)

( * ) Notice: Subject to any disclaimer, the term of this patent is extended or adjusted under 35 U.S.C. 154(b) by 508 days.

(21) Appl. No.: 13/698,285

(22) PCT Filed: May 10, 2011

(86) PCT No.: PCT/EP2011/057494
§ 371 (c)(1),
(2), (4) Date: Nov. 16, 2012

(87) PCT Pub. No.: WO2011/147675
PCT Pub. Date: Dec. 1, 2011

(65) Prior Publication Data
US 2013/0068055 A1    Mar. 21, 2013

(30) Foreign Application Priority Data
May 28, 2010    (DE) .......................... 10 2010 021 917

(51) Int. Cl.
*A47J 43/044*    (2006.01)
*A47J 47/16*    (2006.01)

(52) U.S. Cl.
CPC ................ *A47J 47/16* (2013.01); *A47J 43/044* (2013.01); *A47J 2043/04481* (2013.01); *Y10T 74/18856* (2015.01)

(58) Field of Classification Search
CPC ....................................................... A47J 43/044
USPC .................................................. 366/197, 207
See application file for complete search history.

(56) References Cited

U.S. PATENT DOCUMENTS

| 238,393 | A | * | 3/1881 | Howson | ......................... 366/207 |
| 1,162,811 | A | * | 12/1915 | Savage et al. | ................. 126/345 |
| 2,061,868 | A | | 11/1936 | Fitzgerald | |
| 2,529,120 | A | * | 11/1950 | Wallach et al. | ................ 248/121 |
| 2,552,605 | A | | 5/1951 | Van Guilder | |
| 2,616,673 | A | | 11/1952 | Van Guilder | |
| 2003/0179647 | A1 | * | 9/2003 | Simba | ........................... 366/276 |

FOREIGN PATENT DOCUMENTS

| DE | 730646 C | 1/1943 |
| GB | 1380817 | 1/1975 |
| RU | 2372012 C2 | 11/2009 |
| WO | 2008132429 A1 | 11/2008 |

* cited by examiner

*Primary Examiner* — David Sorkin
(74) *Attorney, Agent, or Firm* — Laurence Greenberg; Werner Stemer; Ralph Locher (57) ABSTRACT

A kitchen appliance includes a main body, a pivoting arm, which is arranged pivotably on the main body at a bearing, and a lever device for assisting a pivoting movement of the pivoting arm. The lever device, which assists the pivoting movement of the pivoting arm on the main body of the kitchen appliance, makes it possible to provide an operation which is safe for a user, since the movement of the pivoting arm is always controlled by the lever device. Furthermore, pivoting of the pivoting arm can be provided without direct interaction of the user.

16 Claims, 7 Drawing Sheets

KITCHEN APPLIANCE WITH A PIVOTING ARM

BACKGROUND OF THE INVENTION

The present invention relates to a kitchen appliance, in particular a food processor, having a main body and a pivot arm, which is arranged pivotably on the main body at a bearing.

Food processors or universal food processors are usually electrical kitchen appliances which are used, as is known, for kneading, stirring, grating, pureeing, or extracting juice. These appliances consist of a main unit with a stirring or collecting dish and various attachments, such as a cutter, mixer attachment, grinding mill, or juice press, as well as various inserts (cutting and grating disks, kneading hooks, pounding and stirring heads). In order to carry out these functions, food processors exhibit a plurality of processing tools. The processing tools can be disk-shaped, drum-shaped, or spherical. Some devices allow for the attachment of individual kneading hooks or eggbeaters. Stirring or collecting dishes are integrated in the device or can be removed; in part, some tools are permanently integrated. Some additional devices are complete units (mincer, juice press), which only make use of the drive system of the processor. The revolution speed with electrical devices can in most cases be regulated in several steps, or is infinitely adjustable. To connect the processing tools, food processors exhibit at least one interface or coupling point, which is set up to connect tools to the electrical drive system.

These food processors exhibit essentially an L-shaped main housing with a horizontal base piece. A processing dish can be arranged on this horizontal base piece, in which the desired ingredients can be processed with the aid of the tool. These generic food processors further exhibit an extension arm, which is attached to the main housing with the aid of a joint. The extension arm exhibits a series of coupling points for said tool. In order, for example, to be able to remove the processing dish, the extension arm exhibits a pivotable bearing point on the main housing, such that, by tilting the arm upwards, the processing dish can be easily removed. A further advantage of the pivotable bearing of the extension arm on the main housing is the possibility, for example, of space-saving storage of the food processor, since the extension arm can be fixed in a perpendicular position. In this position, moreover, additional coupling points can be provided, for a mixer attachment or the like, for example.

In order to control the pivot movements of the extension arm, the devices comprise different appliances on the main housing. WO 2008/132429 A1 accordingly discloses a universal food processor of the type cited, with an extension arm, the movement of which is controlled with the aid of an elastic spring. The kitchen appliance further exhibits a damping means, which counteracts the spring force in order to avoid an uncontrolled folding out of the arm. The damping means corresponds to a hydraulic damper and, according to WO 2008/132429 A1, can exhibit different degrees of damping. This arrangement has proved to be inflexible and complicated, since the spring force exerts a corresponding torque onto the pivot arm, which corresponds to a unilateral outwards pivoting of the arm. Moreover, with this arrangement it is essentially not possible to guarantee a vertical position of the pivot arm.

BRIEF SUMMARY OF THE INVENTION

The invention is based on the object of providing a kitchen appliance which is improved in relation to the prior art, which is convenient to use, and which provides for flexible pivoting of the pivot arm.

The object is resolved by a kitchen appliance with the features of claim 1. The kitchen device according to the invention is based on generic kitchen appliances in that it exhibits a lever device for assisting a pivoting movement of a pivot arm. The lever device interacts with the pivot arm at a bearing point, in such a way that a user can easily control the pivoting movement. For example, the user can easily move the pivot arm upwards after releasing a safety switch, since the lever device exerts a correspondingly assisted torque on the pivot arm.

The lever device may moreover exert a torque which changes direction, which assists the pivoting movement in both directions, namely towards the main body or away from it. The pivot arm includes inter alia a drive unit for different processing tools, such as a planetary gear, which causes a relatively high dead weight of the pivot arm. The lever device has the further advantage that the dead weight of the pivot arm can be compensated for. By adjusting the geometry of the lever device, the pivoting movement can, as a function of the dead weight and/or friction values, be accurately set at the bearing point, and reliably and conveniently for a user.

Advantageous embodiments and further embodiments, which can be used individually or in combination with one another, form the subject matters of the dependent claims.

It is preferred for the lever device to be designed in such a way that a torque can be exerted on the pivot arm, wherein the direction of the torque depends on a pivoting position of the pivot arm. Due to the directional dependency of the torque on the pivoting position of the pivot arm, it is possible optionally for a folding upwards or downwards of the pivot arm to be carried out by means of the lever device. Consequently an automatic pivoting of the arm in both directions is guaranteed.

The pivot arm preferably exhibits a first operating position, in which a pivot arm axis runs essentially horizontally, wherein, in the first operating position, the lever device is embodied in such a way that the torque exerted in the direction of a pivoting movement of the pivot arm is directed away from the main body. This advantageous embodiment of the lever device enables the pivot arm to automatically pivot upwards, such that, for example, further ingredients can be added into the processing dish of the food processor. The user of the kitchen appliance can for example actuate a safety button, which will consequently release the pivot arm so that it can pivot freely. The lever device introduces a torque on the pivot arm, which undergoes an upwards folding movement, i.e. a movement away from the main body. The lever device is dimensioned in such a way that the dead weight of the pivot arm can be compensated for. As a result of this dimensioning, the speed of the upwards folding movement can also be controlled, which further improves the user-friendliness and safety of the kitchen appliance.

According to the invention, the pivot arm preferably comprises a switchover position in such a way that the torque which can be exerted by the lever device onto the pivot arm is essentially cancelled out. In this switchover position of the pivot arm, the lever device does not exert any torque, as a result of which a defined position of the pivot arm can be achieved. A slight movement of the pivot arm and/or actuation of a controlling element or an operating element enables the user to reactivate the lever device, such that it can assist the pivot arm in the pivoting movement. This switchover position corresponds to a bistable position, from which the pivot arm can be brought out by user interaction.

According to the invention, the pivot arm can preferably be pivoted by a user of the kitchen appliance, wherein the lever device is embodied in such a way that, in the event of the switchover position of the pivot arm being exceeded, a reversal of the exerted torque takes place. In the event of the switchover position being exceeded, a reversal of the torque direction will be caused by the lever device, which optionally corresponds to a folding outwards or inwards (lowering) of the pivot arm. This exceeding of the position can likewise be perceived by a user of the kitchen appliance by tactile sensation, if for example he folds the pivot arm downwards and exceeds this switchover position. After this position has been exceeded, a reversal of the torque direction causes the pivot arm to be automatically folded in or out respectively by the lever device. The user consequently only needs to secure the pivot arm in this lowered position, wherein the securing can likewise take place automatically.

According to one embodiment of the present invention, the lever device is coupled to the bearing in such a way that the exerted torque can be introduced into the pivot arm via the bearing. As a result, a compact design of the kitchen appliance housing can be guaranteed, and, moreover an adjustment of the torque can be carried out by the dimensioning of the bearing.

According to another embodiment of the present invention, the lever device is coupled to the pivot arm in such a way that the exerted torque can be introduced directly into the pivot arm. Consequently the bearing can be established more simply, since no direct interaction with the lever device is necessary. This can extend the service life of the kitchen appliance, since the wear on the bearing can be reduced.

The lever device expediently comprises a first lever, which is coupled to the bearing and pivots with the pivot arm. The lever allows for an interaction between the lever device and the bearing, wherein, due to the geometry and/or dimension of the lever, the torque exerted can be adjusted. Accordingly, for example, during the final assembly of the kitchen appliance, a newly dimensioned lever can be used. It is conceivable that the first lever is of linear design, and exhibits different areas for the interaction with the second lever. Thus, for example, these areas can be distributed on the linear lever, wherein the final area can only be selected during final assembly. Consequently, redimensioning of the lever can take place without components being exchanged.

The lever device further comprises a second lever, which interacts with the first lever in a joint. The interaction of the second lever in a joint allows for a low-friction and low-maintenance connection. The joint can, moreover, be newly fitted on the linearly embodied first lever during final assembly, since this may exhibit different receiving areas for the second lever. Due to the plurality of receiving areas on the first lever, the dimension and the geometry of the lever device can consequently be influenced and adjusted accordingly. The joint is formed for example by a groove and borehole, wherein the borehole can receive the groove. Consequently, several boreholes can be arranged on the first linearly running lever. Accordingly, the joint can be placed in a new position, which can control the extent of the torque which can be exerted.

According to the invention, the second lever on the side opposite the joint preferably interacts with an active force means, in particular an elastic spring, at a coupling point which is coupled to the main body. As a result of the active force means, a torque can be exerted on the pivot arm without user interaction being necessary.

Advantageously, the second lever exhibits a curved or angular shape. By means of this shape, a compact design of the lever device can be guaranteed in a housing of the kitchen appliance.

According to a further embodiment of the present invention, the pivot arm exhibits at least one pivot setting or pivot position, in which the second lever runs about a bearing axis of the bearing in such a way that the bearing axis is arranged between the joint and the coupling point. This is advantageous in that the force of the active force means can be transferred about the bearing axis or the bearing journals of the bearing, without the compact design of the kitchen appliance having to be altered.

The lever device expediently exhibits means for damping the pivoting movement of the pivot arm. The means for damping increases the safety of the pivot arm, because the pivot arm cannot fold up or down in an uncontrolled manner.

It is preferred for the lever device to be embodied in such a way that the means for damping the pivoting movement to be provided by the lever device itself. This means that additional means can be saved. The special geometry and dimensioning of the lever device compensate for the dead weight of the pivot arm.

The present invention is particularly well-suited to food processors which exhibit a pivot arm and a plurality of coupling points for processing tools. A user can operate the pivot arm flexibly and safely, such that different tools can be connected and/or a space-saving storage and safekeeping of the kitchen appliance can be provided.

BRIEF DESCRIPTION OF THE DRAWINGS

Further advantageous embodiments are described in greater detail hereinafter on the basis of an exemplary embodiment represented in the drawings, although the invention is not restricted to this.

The drawings show:

FIG. 3b A perspective view of the kitchen appliance according to FIG. 3a;

FIG. 4a A side view of the kitchen appliance according to the invention, with the pivot arm folded in; and finally FIG. 4b A perspective view of the kitchen appliance from FIG. 4a.

DETAILED DESCRIPTION OF EXEMPLARY EMBODIMENTS OF THE PRESENT INVENTION

In the following description of preferred embodiments of the present invention, the same reference figures designate the same or comparable components.

Figure 1:
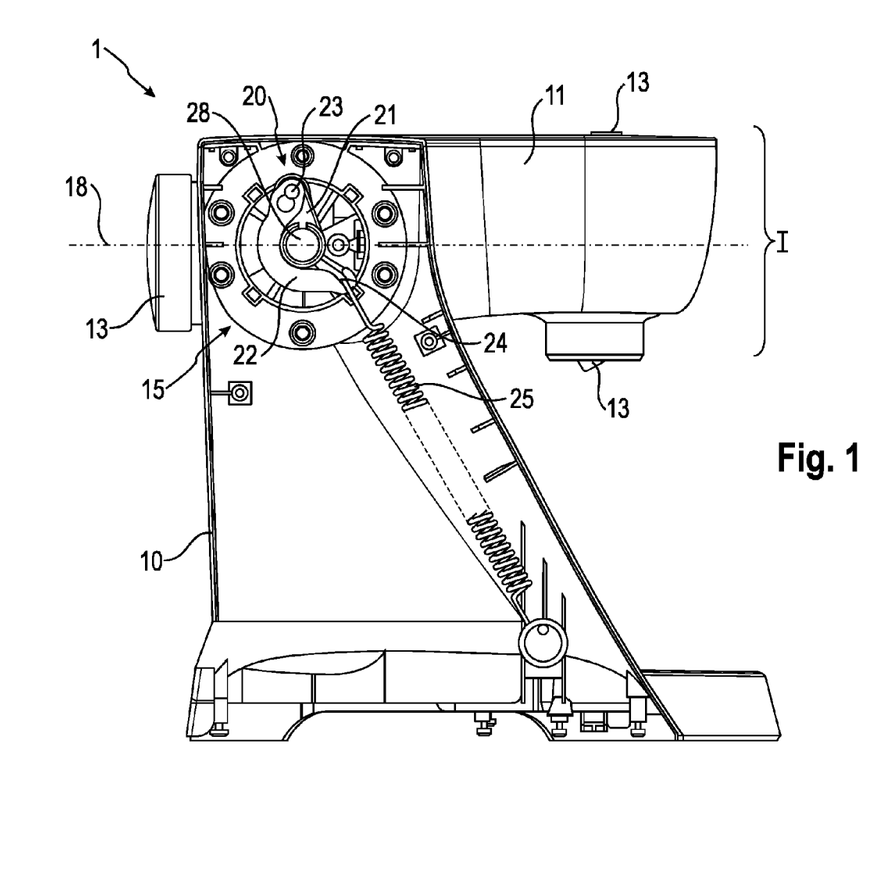
FIG. 1 A side view of a kitchen appliance according to the present invention.

FIG. 1 shows a kitchen appliance, in particular a kitchen appliance 1 with an electric motor, preferably a solo or universal food processor with an electric motor according to the present invention. The kitchen appliance 1 exhibits an essentially L-shaped structure with a base piece 14, on which a dish (not shown) can be placed for accommodating foodstuffs. The kitchen appliance 1 comprises a main body 10 and a pivot arm 11. According to this embodiment of the present invention, the pivot arm 11 exhibits a plurality of coupling points 13 for processing tools (not shown). Processing tools may mean, in particular, pureeing, mixing, chopping, kneading, and/or cutting mechanisms, pounding or stirring heads respectively, beverage mixers, cyclic shredders, grinding mills, citrus or fruit presses, and/or meat mincers. Depending on the pivot arm position, individual coupling points 13 can be operated, wherein the drive motor of the electrical kitchen appliance 1 is usually arranged in the main body 10, and its torque is transferred via suitable drive devices to the individual coupling points 13. Accordingly, for example, the coupling point 13 in the lower area of the pivot arm, with reference to FIG. 1, is used for example for the operation of a stirring tool for the processing of dough. The coupling point 13 arranged laterally on the pivot arm 11 can be used for the connection of a meat mincer, wherein other processing tools can also be used.

The pivot arm 11 interacts with the main body 10 of the kitchen appliance at a bearing 15. The bearing 15 is designed in such a way that the pivot arm 11 can adopt different operating settings or operating positions I, II, III, FIG. 1 shows a first operating setting I, in which the pivot arm 11 is fixed horizontally in order for example for dough to be processed in a stirring dish beneath the coupling point 13. In this operating setting I, the pivot arm axis runs essentially horizontally. The bearing exhibits a bearing axis 28, which is defined, for example, by a bearing journal. The pivot arm 11 is suitably coupled to this bearing journal, such that a simple pivoting movement can be guaranteed. The arm 11 consequently essentially pivots between two end positions, namely the position in which the pivot arm axis 18 runs parallel to the main body and a further position, in which the pivot arm axis 18 corresponds to the extension of the main body axis. The continuous bearing arrangement of the pivot arm 11 at the bearing 15 enables different intermediate positions II to be adjusted.

The lever device 20, which is coupled to the bearing 15, exhibits according to this embodiment a first lever 21 and a second lever 22. The second lever 22 interacts in a connection area 24 with an elastic spring 25. The elastic spring 25 is also secured accordingly to the main body 10. The main body 10 provides a firm retention point for the spring 25, such that the lever device 20 can implement the spring force to assist the pivot arm 11. The first and second levers 21, 22 interact correspondingly in a joint 23, which transfers the spring force, which acts on the second lever 22, onto the first lever 21. The first lever 21, according to this embodiment, is arranged at the bearing axis 28 of the bearing 15, and transfers the torque onto the pivot arm 11. The first lever 21 is arranged at the bearing 15 in such a way that it pivots with the pivot arm 11 and can convert the spring force into a torque which assists the arm 11. The function of the lever device 20 is described in greater detail on the basis of the following figures.

Figure 2A:
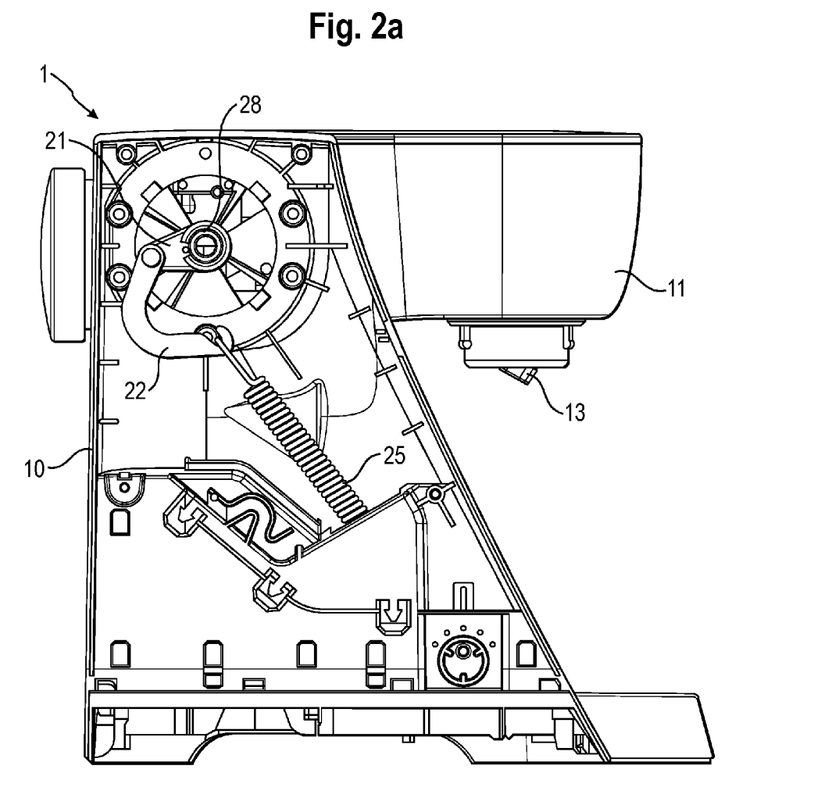
FIG. 2a A further side view of the kitchen appliance according to the invention.

FIG. 2a shows a side view of the kitchen appliance according to the present invention. The pivot arm 11 is fixed in a first operating position I in a similar manner to FIG. 1, such that, for example, foodstuffs can be processed in a dish arranged on the base piece 14. The spring 25 which interacts with the second lever 22 in a second joint 24 exhibits a tensioned state (i.e. the spring is tensioned). Accordingly, the elastic spring draws on the second lever 22 with a specific force. This force is transferred further via the first joint 23 to the first lever 21. The first lever is arranged in a torque-proof manner on the bearing axis 28, and therefore exerts a torque produced by the spring force onto the bearing axis 28. Because the bearing axis 28 is connected to the pivot arm 11, this torque consequently also acts on the pivot arm 11. So that the arm 11 cannot be pivoted out of the operating position I, the kitchen appliance exhibits a securing device (not shown) or a fixing device of the pivot arm. The securing device accordingly compensates for the torque and the kitchen appliance 1 can be safely operated in this operating position 1.

According to a possible embodiment, the securing device of the pivot arm 11 can, for example, be arranged by means of an operating button (not shown) arranged on the pivot arm 11, or, optionally, this operating button can be arranged at a suitable location on the main body 10. The actuation of the operating button by a user has the effect that the pivot arm 11 can again pivot freely, and therefore the torque exerted by the spring force can act on the pivot arm 11. According to this arrangement, the torque would cause the folding upwards of the pivot arm, i.e. the pivot arm 11 moves upwards away from the main body 10.

In the folded upwards state, the dish can consequently be reached more easily and ingredients such as foodstuffs or the like can be filled. Replacing the processing tool at the coupling point 13 can consequently also be carried out more easily and in a more user-friendly manner.

Figure 2B:
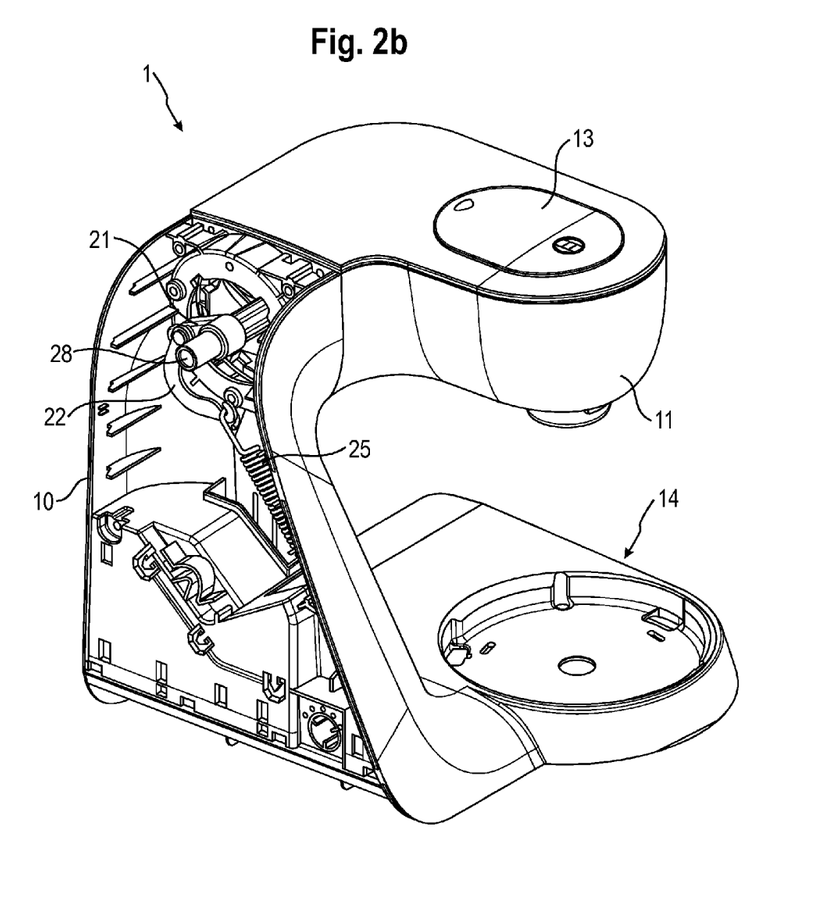
FIG. 2b A perspective view of the kitchen appliance according to the invention, in a first operating position.

FIG. 2b shows a perspective view of the kitchen appliance. The first lever 21 is arranged on the bearing axis 28 in such a way that the lever can pivot in synchrony with the pivot arm 11. Once the securing device described heretofore has been released, the spring force will draw on the first lever 21 via the second lever 22. This accordingly exerts a torque on the pivot arm 11, which causes the pivot arm to fold upwards or pivot upwards. Due to the dimensioning of the lever different torques can be adjusted, which can be adjusted to the dead weight of the pivot arm 11.

According to another embodiment of the lever device 20, a torque can be exerted on the pivot arm 11, which causes the pivot arm to fold downwards. This can be achieved by a suitable setting of the first lever 21 in relation to the bearing axis 28. To do this, the joint 23 must be arranged in accordance with the representation from FIG. 2b, to the right of the bearing axis 28. Consequently, the torque would cause the pivot aim 11 to fold down.

It is also conceivable for the first and/or second levers 21, 22 to be dimensioned in such a way that the dead weight of the pivot arm, i.e. the torque exerted thereby on the bearing axis 28, overcomes the torque exerted by the spring force, which would likewise lead to the pivot arm folding down. In this case, a user would have to move the pivot arm 11 in the direction of the first operating position I himself.

Figure 3A:
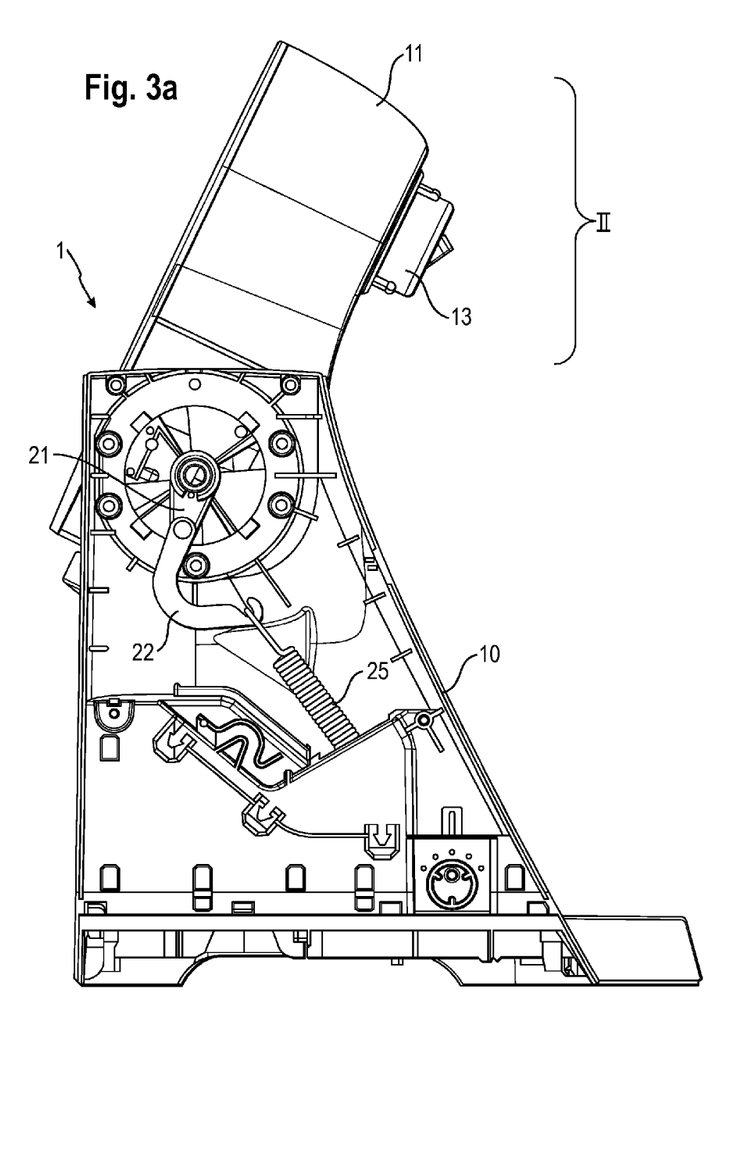
FIG. 3a A side view of the kitchen appliance according to the invention in an intermediate position.

FIG. 3a shows the kitchen appliance according to the invention in a side view, in an intermediate position. According to this intermediate position II of the kitchen appliance shown in FIG. 3a, the torque exerted on the pivot arm has essentially been suspended. This suspension is put into effect by the dead weight of the pivot arm 11, which produces a counter-torque on the bearing axis 28 of the pivot arm 11, which is opposed to the torque produced by the spring force. It may be noted that the angle of the pivot arm in relation to the horizontal axis can further be dependent on the processing tools connected to the coupling point 13. This occurs, for example, if relatively heavy tools (kneading hooks) are used.

The lever device 20 according to the present invention exhibits means for damping the pivoting movement of the pivot arm 11. According to one embodiment, the geometry and dimensioning of the levers themselves provide the means for damping. The means damp the pivoting movement of the pivot arm 11 in such a way that no rapid upwards or downwards folding of the pivot arm 11 can occur. Accordingly, the tensile force of the elastic spring and/or the geometry of the respective levers 21, 22 is adjusted to the dead weight of the pivot arm 11. By means of this adjustment, a relatively slow pivoting movement can be realized, which substantially improves the user-friendliness and safety of the kitchen appliance.

Figure 3B:
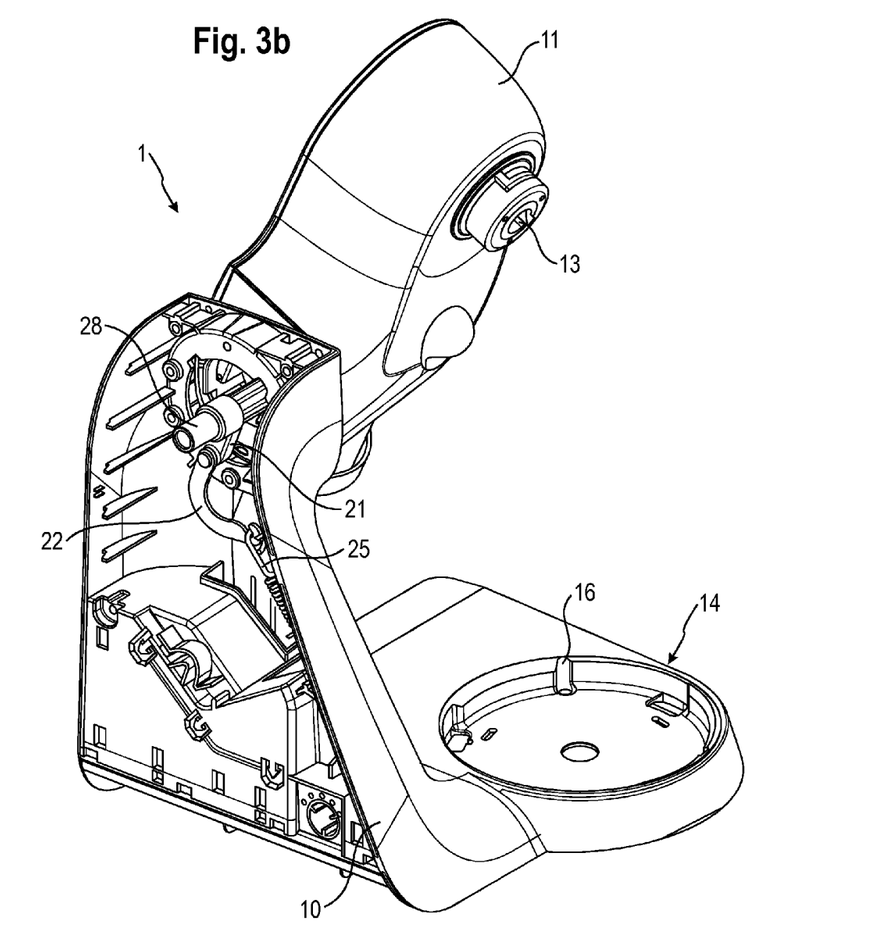

FIG. 3b shows a perspective view of the kitchen appliance in an intermediate position according to FIG. 3a. According to this embodiment, the bearing 15 exhibits a bearing journal at the bearing axis 28, at which the first lever 21 is arranged in a torque-proof manner. The first lever 21 can consequently pivot in synchrony with the pivot arm 11, since the bearing axis 18 and the bearing journal respectively pivot along with the pivot arm.

According to a further embodiment of the invention, the lever device 10 can be in direct contact with the pivot arm 11, such that the spring force can be introduced directly into the pivot arm 11, without the bearing axis 28 having to be subjected to a load. This provides the advantage that higher tensile forces can be absorbed directly from the pivot arm 11.

Figure 4A:
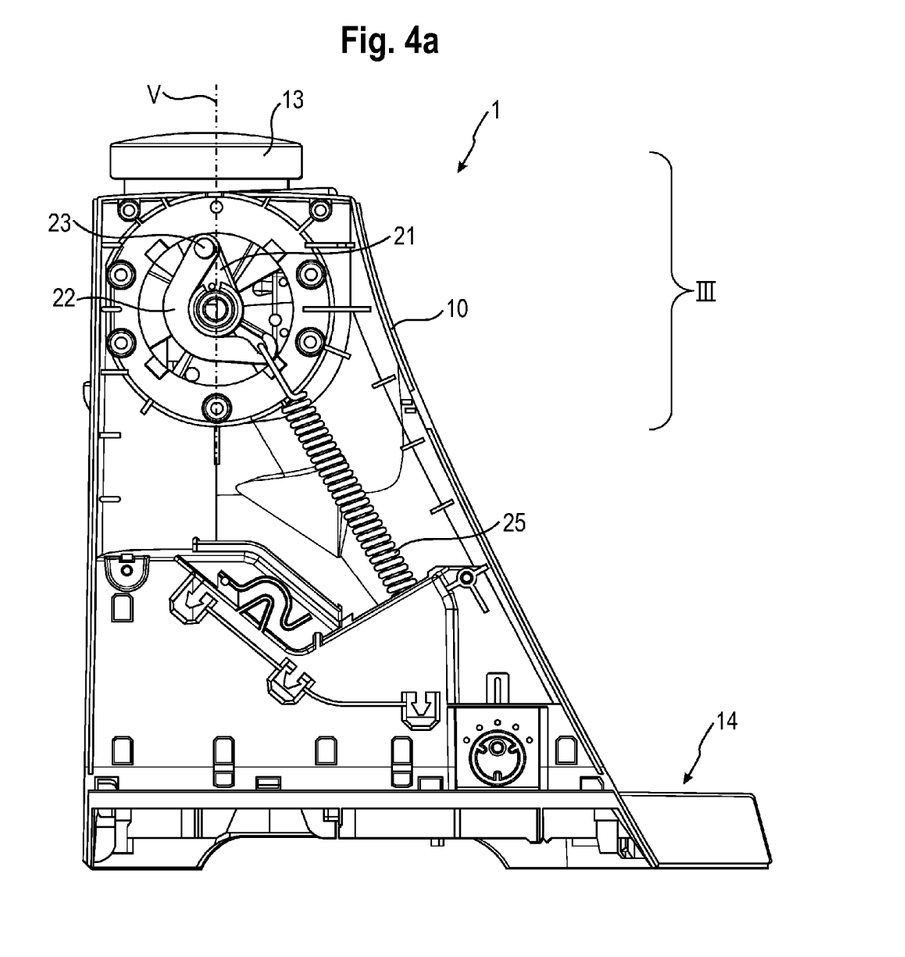
Figure 4B:
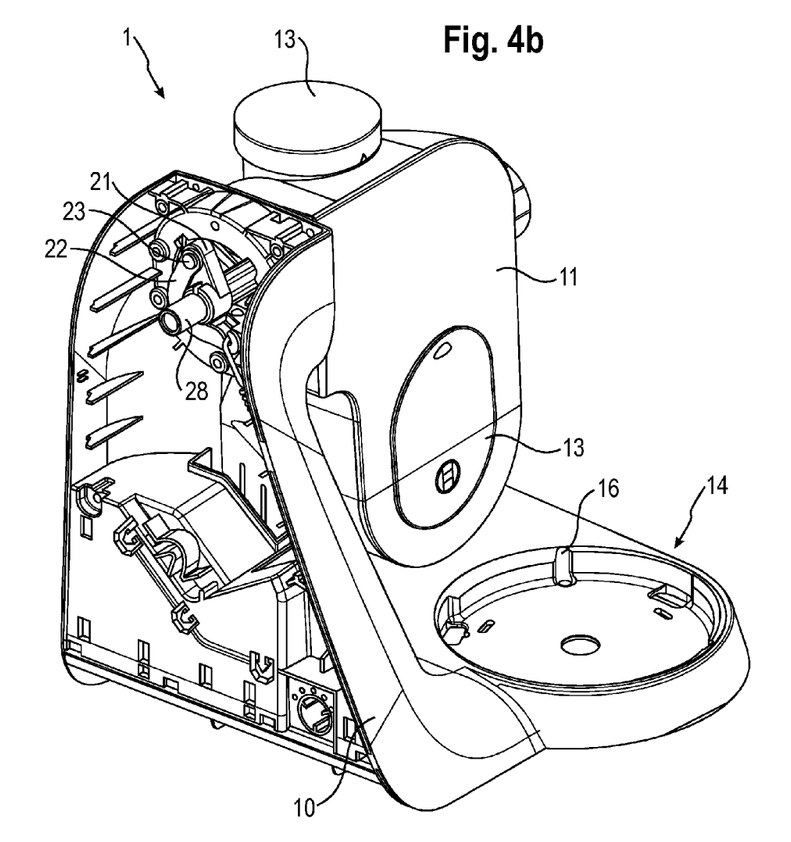

FIG. 4b shows a further operating position of the pivot arm. According to this operating position, the pivot arm 11 is completely folded in, wherein its axis runs essentially vertically and is parallel to the axis of the main body 10. In other words, the pivot arm 11 points in the direction of the plane of the base piece 14, on which, for example, a dish can be arranged. In this position of the pivot arm, the coupling point 13 may be occupied by a mixer attachment, but juice extraction units or the like can also be connected.

This operating position according to this embodiment could correspond to a switchover position III, in which the torque exerted by the spring force on the pivot arm 11 is essentially suspended. According to this operating position the dead weight of the pivot arm does not exert any torque, since the weight force vector runs parallel to the interval vector, defined by the centre of gravity of the pivot arm 11 and of the bearing axis 28. At the switchover position III the spring exhibits its maximum obtainable tension. In order for the kitchen appliance 1 to be safely operated in this position, it exhibits a safety device, which has been described in greater detail heretofore.

In the switchover position III a reversal can take place of the torque exerted by the spring force. If for example the joint 23 is arranged by reference to FIG. 4a to the right of the vertical V through the bearing axis 28, the pivot arm is pressed in the direction towards the main body 10. According to this embodiment, however, the lever device 20 is aligned in such a way that the joint 23 is arranged slightly to the left in relation to the vertical V, which would correspond to a folding upwards of the pivot arm, and due to friction forces in the bearing the torque is suspended.

The switchover point III is attained according to this example with a pivot arm folded in, but other angles of the pivot arm 11 in relation to the horizontal can also be adjusted. In order to attain this, the lever device can be readjusted, for example by a readjustment of the first lever 21 at the bearing.

If a user actuated the operating button of the securing device in the event of the switchover position III, the pivot arm 11 will be brought out of the switchover position III, and a reversal of the torque exerted by the spring force will take place. In other words, the spring 25 moves the pivot arm 11 in the direction of the first operating position I. The lever device 20 exhibits the particular advantage that a reversal of the torque which is exerted on the pivot arm 11 via the bearing axis 28, or directly at the pivot arm 11, can take place.

The second lever 22 exhibits a curved course, which in particular in the switchover position III runs around the bearing axis 28. Accordingly, the transfer of the spring force from the second joint 24 to the first joint 23 can take place in a space-saving manner. This is advantageous, since the space inside the housing of a kitchen appliance 1 is limited.

As an alternative to the curved shape, an angled shape can also be used. By way of this arrangement, the device defined by the two levers 21, 22 can exhibit the flattest possible structure, such that the installation in the housing can be carried out in a user-friendly manner.

FIG. 4b shows a perspective view of a kitchen appliance according to the invention, wherein the pivot arm is folded in. The base piece 14 is set up in order, for example, to receive a dish, wherein the fixing of the dish can be provided by means of different catch elements 16. In this view, the space-saving arrangement of the lever device inside the housing of the main body 10 can be identified. The second lever 22, which transfers the spring force by means of the joint 23 onto the first lever 21, is arranged around the bearing journals of the bearing axis 28, which ensures a particularly flat and even arrangement of the lever device 20. Both joints 23 and 24 are arranged together with the axis of the spring 25 in one plane, which leads to a space-saving arrangement. As described heretofore, the second lever 22 may also adopt another shape, in which the two joints 23 and 24 and the spring axis lie in one plane.

Thanks to the lever device, which assists the pivoting movement of the pivot arm at the main body of the kitchen appliance, safe operation can be ensured for the user, since the movement of the pivot arm is always controlled by the lever device. In addition, a pivoting of the pivot arm can be provided without direct interaction from a user. The user can actuate a manual control, in the form of an operating button, for example, and the lever device can exert a torque on the pivot arm, which exerts a controlled lowering or upwards folding of the pivot arm.

The invention claimed is:

1. A kitchen appliance, comprising:
   a main body;
   a pivot arm;
   a bearing pivotably supporting the pivot arm on the main body, said bearing having a bearing axis;
   and a lever device assisting a pivoting movement of the pivot arm, the lever device coupled to the bearing for introducing torque into the pivot arm by way of the bearing, the lever device having a first lever coupled to the bearing and pivoting with the pivot arm, the lever device having a second lever rotationally connected the first lever by a joint having a joint axis being parallel to the bearing axis and spaced apart from the bearing axis, the first lever connecting the joint to the bearing.

2. The kitchen appliance of claim 1, wherein the lever device is constructed to exert a torque on the pivot arm, with a direction of the torque depending on a pivoting position of the pivot arm.

3. The kitchen appliance of claim 2, wherein the pivot arm defines a pivot arm axis and has a first operating position, in which the pivot arm axis is oriented essentially horizontally, said lever device being configured such that in the first operating position the torque exerted in the direction of a pivoting movement of the pivot arm is directed away from the main body.

4. The kitchen appliance of claim 2, wherein the pivot arm has a switchover position in which the torque exerted by the lever device on the pivot arm is essentially suspended.

5. The kitchen appliance of claim 4, wherein the pivot arm is pivotable by a user of the kitchen appliance, said lever device being constructed to reverse the exerted torque, when the pivot arm exceeds the switchover position.

6. The kitchen appliance of claim 2, wherein the lever device is connected to the pivot arm in such a way that the exerted torque is introducible directly into the pivot arm.

7. The kitchen appliance of claim 1, wherein the lever device is coupled to the main body.

8. The kitchen appliance of claim 1, wherein the second lever interacts on a side opposite the joint with an active force-applying member at a connection point, with the force-applying member being coupled to the main body.

9. The kitchen appliance of claim 8, wherein the force-applying member is an elastic spring.

10. The kitchen appliance of claim 1, wherein the second lever has a curved shape or an angled shape.

11. The kitchen appliance of claim 8, wherein the pivot arm has at least one pivoting position in which the second lever runs about a bearing axis of the bearing, in such a way that the bearing axis is arranged between the joint and the connection point.

12. The kitchen appliance of claim 1, wherein the lever device has a damping mechanism for damping the pivoting movement of the pivot arm.

13. The kitchen appliance of claim 1, wherein the lever device is constructed for damping the pivoting movement of the pivot arm.

14. The kitchen appliance of claim 1, wherein the pivot arm has a plurality of individual coupling points at different positions on the pivot arm for processing tools.

15. The kitchen appliance of claim 1, further comprising an elastic member generating the introduced torque, the second lever being connected between the elastic member and the first lever.

16. The kitchen appliance of claim 15, wherein the elastic member is connected between the second lever and the main body.

\* \* \* \* \*